United States Patent
Ihonen et al.

(10) Patent No.: US 10,622,651 B2
(45) Date of Patent: Apr. 14, 2020

(54) METHODS RELATING TO MONITORING FUEL CELLS

(71) Applicant: Teknologian tutkimuskeskus VTT Oy, Espoo (FI)

(72) Inventors: Jari Ihonen, Espoo (FI); Kaj Nikiforow, Espoo (FI); Henri Karimäki, Espoo (FI); Timo Keränen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 435 days.

(21) Appl. No.: 14/893,082

(22) PCT Filed: May 13, 2014

(86) PCT No.: PCT/FI2014/050358
§ 371 (c)(1),
(2) Date: Nov. 23, 2015

(87) PCT Pub. No.: WO2014/188061
PCT Pub. Date: Nov. 27, 2014

(65) Prior Publication Data
US 2016/0099478 A1    Apr. 7, 2016

Related U.S. Application Data

(60) Provisional application No. 61/826,513, filed on May 23, 2013.

(51) Int. Cl.
*H01M 8/04492* (2016.01)
*H01M 8/04119* (2016.01)
(Continued)

(52) U.S. Cl.
CPC ... *H01M 8/04514* (2013.01); *H01M 8/04097* (2013.01); *H01M 8/04179* (2013.01);
(Continued)

(58) Field of Classification Search
CPC ......... H01M 8/04179; H01M 8/04231; H01M 8/04402; H01M 8/0441; H01M 8/04462; H01M 8/0447
See application file for complete search history.

(56) References Cited

U.S. PATENT DOCUMENTS

2004/0080297 A1\* 4/2004 Leboe ............... H01M 8/04089
320/101
2005/0164050 A1    7/2005 Reiser
(Continued)

FOREIGN PATENT DOCUMENTS

JP    2006339112 A    12/2006
JP    2007005176 A    1/2007
(Continued)

*Primary Examiner* — Robert S Carrico
(74) *Attorney, Agent, or Firm* — Laine IP Oy

(57) ABSTRACT

The invention relates to a method of determining water accumulation in and or removal from a fuel cell, the method comprising circulating fuel gas in the anode side of the fuel cell for producing electric energy in a fuel cell process, providing at least two purge pulses from the fuel circulation, analyzing the composition and/or volume of purged gas of said at least two gas purge pulses for determining the amount of water accumulation in and/or removal from the fuel cell.

14 Claims, 3 Drawing Sheets

(51) Int. Cl.
*H01M 8/0444* (2016.01)
*H01M 8/04089* (2016.01)
*H01M 8/1018* (2016.01)

(52) U.S. Cl.
CPC ..... *H01M 8/04462* (2013.01); *H01M 8/1018* (2013.01); *H01M 2008/1095* (2013.01); *H01M 2250/20* (2013.01); *H01M 2300/0082* (2013.01); *Y02T 90/32* (2013.01)

(56) References Cited

U.S. PATENT DOCUMENTS

| | | |
|---|---|---|
| 2006/0121326 A1 | 6/2006 | Hiramatsu et al. |
| 2007/0026276 A1 | 2/2007 | Ogawa et al. |
| 2008/0008921 A1* | 1/2008 | Miura .................... H01M 8/04 429/429 |
| 2010/0136448 A1 | 6/2010 | Herron |
| 2010/0190071 A1 | 7/2010 | Kaito et al. |
| 2011/0183220 A1* | 7/2011 | Bae .................. H01M 8/04179 429/414 |
| 2013/0052545 A1 | 2/2013 | Okuyoshi |

FOREIGN PATENT DOCUMENTS

| | | |
|---|---|---|
| JP | 2008041611 A | 2/2008 |
| JP | 2006300261 A | 12/2008 |
| JP | 2009129760 A | 6/2009 |
| JP | 2009146619 A | 7/2009 |
| JP | 2010108756 A | 5/2010 |
| JP | 2013057511 A | 3/2013 |

* cited by examiner

METHODS RELATING TO MONITORING FUEL CELLS

FIELD OF THE INVENTION

The invention relates to fuel cells. In particular, the invention relates to determining water accumulation in the anode side of a polymer electrolyte fuel cell (PEFC) and determining fuel cell system performance. The invention also relates to corresponding fuel cells.

BACKGROUND OF THE INVENTION

In fuel cells operating at dead-end mode there is accumulation of both inert gas and water on the anode side of the cell. Water is accumulated in the channels and it is periodically removed by so called "hydrogen purge", by opening the exit valve of the anode side for a short period of time.

The hydrogen purge has a dual function. It removes both accumulated inert gas as well as water from anode channels. The removal of inert gas can be directly measured using a hydrogen concentration sensor. However, there is no practical and accurate method for measurement for the removal of water, especially when the pressure drop over the anode is small. If the pressure drop is high and if the flow rate of re-circulated anode gas is known, then the change in pressure drop can be used for the detection of water removal.

When the purge duration and frequency can be optimized, fuel efficiency can be increased slightly (up 1-3‰).

The water accumulation on the anode side can be detected from the change in the differential pressure signal before and after the purge. However, the use of differential pressure is only possible if the flow rate on the anode gas remains constant and if the pressure difference is large enough. This is not the case, when the fuel cell is operated at low power or when the anode pressure drop is otherwise very small (under 10 mbar).

There is a need for a method for determination of water accumulation inside PEFC stack anode for example in in order to be able to develop an optimal purge strategy.

Pressure drop with a certain flow rate and gas composition is currently a primary diagnostic method for accumulation of water on the anode side. Recirculation flow rate can be easily calculated from the current (hydrogen consumption). When recirculation rate is low (pump used, instead of ejector) the pressure drop is low and use of pressure signal is more difficult. In addition, if diaphragm type of pump is used, the pulsing flow makes the use of pressure signal more difficult to measure.

It is at low flow rates, when also the water accumulation is also most severe, as cathode humidity is highest and flow velocity on the anode lowest. Low flow rates are also encountered during start-up and shut-down, when it is especially wet conditions in the cells. Therefore, at low flow rates an additional method for the detection of water accumulation in the channels is needed Thus, there is a need for determining water accumulation at low load levels, this being difficult with traditional measurements (pressure drop dP between inlet and outlet).

To mention further problems relating to PEFC systems, hydrogen, which is consumed in hydrogen fuel cell system, contains always some amount of inert gases including also carbon dioxide. These gases enrich in fuel cell system, as hydrogen fuel cell system is operated in dead end mode with recirculation and purge.

Further, in fuel cells operating at dead-end mode the real fuel utilization is very difficult to measure on-line or during annual maintenance. Fuel utilization is, however, a key parameter to measure the efficiency and aging of the system. The fuel utilization will change during the life-time of the stack/system as there will be changes in stack component properties (membrane, gas diffusion layer, bipolar plate).

In long measurement, pressure and temperature of gas storage can be used for the calculation of fuel utilization. This requires highly accurate measurement of both pressure and temperature of the gas storage. On the other hand, momentary fuel utilization in certain operation point requires accurate measurement of hydrogen flow during a hydrogen purge. The measurement of gas flow rates during the purge is possible to perform in laboratory experiments (Nikiforow et al. 2012). However, in commercial fuel cell systems the required instrumentation is far too expensive.

Fuel efficiency is not accurately measured on-line in existing fuel cell systems. For this reason, determination of PEFC system aging, to mention one example, is difficult.

Thus, there is a need for methods making it possible to accurately measure of fuel utilization with reasonable instrumentation and cost.

SUMMARY OF THE INVENTION

It is an aim of the invention to provide solutions to the abovementioned problems.

Multiple Purge Method for Detecting Water Accumulation in Anode Gas Channels A particular aim is to provide a method, which can be used to reliably determine the accumulation of water in fuel cells. One specific aim is to provide a method, which is suitable to be used at low load levels of the fuel cell.

An aim is also to provide a corresponding fuel cell system.

According to a first aspect, water accumulation in the channels of the anode side of a polymer fuel cell is detected using a "double-purge" or a "multi-purge" method. This means that two or more short hydrogen purges are made within a short period of time to determine water accumulation. A "purge" means a short period of keeping a closing valve of the cell in opened state, resulting is gas (and water) removal from the cell, i.e. a gas removal pulse.

According to one embodiment of the first aspect, there is provided a method of determining water accumulation in and or removal from hydrogen fuel cell, the method comprising
 circulating hydrogen in the anode side of the fuel cell for producing electric energy in a fuel cell process,
 providing at least two purge pulses from the hydrogen circulation, and
 analyzing the composition and/or volume of purged gas of said at least two gas purge pulses for determining the amount of water accumulation in and/or removal from the fuel cell.

According to one embodiment, the invention comprises monitoring the amount of accumulated water and its removal from the anode side of a fuel cell by comparing ratio(s) of gas amounts removed from the cell during two or more hydrogen purges, preferably of the same length, utilizing measurement of hydrogen concentration.

In a preferred embodiment, the $H_2$ concentration measurement is used together with a certain purge valve opening sequence including at least two hydrogen purges.

The invention has considerable advantages.

First, the invention works well when flow rates are low, i.e. pressure difference between input and output of the cell (dP) is low. Second, the invention can be carried out utilizing instruments already existing in a commercial PEFC system, but using them for another purpose. The method has been verified experimentally.

In addition to low power operation, the method provides particular benefits during shut-down sequence of a fuel cell.

In this innovation, the existing equipment (humidity and hydrogen concentration sensors, system components, data aquistion) can be used with no modifications. In particular, no additional instrumentation the vehicle fuel cell systems are needed since these systems will normally be equipped with humidity and hydrogen concentration sensors. Therefore, only small amount of programming work for the control system is needed. Thus, the use of this innovation causes no extra cost for system developers, only benefits.

According to one embodiment of the first aspect of the invention, the method comprises determining the amount of accumulated and/or removed water by calculating a ratio of gas amounts removed from the cell during said at least two hydrogen purges.

One quantity to be preferably measured from the purged gas is hydrogen concentration in said gas purge pulses. Hydrogen concentration can be used for determining the amount of accumulated and/or removed water.

According to further embodiments of the first aspect of the invention, the method comprises providing the at least two gas purge pulses via a purge valve according to a purge valve opening sequence, the purge pulses in said sequence being triggered for example by
predefined purge valve triggering scheme,
periodically using time elapsed,
amount of current produced by the fuel cell, and/or
predefined increase of pressure drop at the anode side.

In a typical system, the at least two gas purges are provided within a (short) time period which is short compared to the time needed for water accumulation, typically within 5 seconds and the purge pulses each have a duration of a fraction of a second. The time period is preferably such that essentially no new water accumulates in the anode gas channels during that period.

Further, the invention is most advantageous if the fuel cell has a so-called dead-end configuration. In particular, the invention is advantageous in dead-end PEFC systems. The method is further particularly suitable to be used in fuel cells where pressure drop is small, which typically happens when systems are operated at low partial load.

The present multiple-purge method can be used further for deriving a parameter descriptive of system performance or system aging.

According to one embodiment of the first aspect, the method comprises measuring gas volumes purged during said purge pulses and determining said amount of water accumulation and/or removed at least partly based on said gas volumes.

The method can be carried out in a fuel cell system of a vehicle, such as a car, or in a stationary fuel cell system.

Method of Analyzing Fuel Cell System Performance Using Tracer Gas and Tracer Gas Sensor A further aim is to provide an improved method for determining fuel cell performance, such as fuel consumption.

An aim is also to provide a corresponding fuel cell system.

According to one embodiment of the second aspect, there is provided a method for analyzing fuel cell system performance, the method comprising
providing tracer gas to anode gas circulation of the fuel cell, the anode gas circulation being conveyed through anode cells,
purging gas from the anode gas circulation, preferably at a location downstream from anode cells, and
measuring the concentration of the tracer gas in the purged gas using a tracer gas sensor, and
utilizing said concentration of the tracer gas to derive a system performance parameter.

According to an embodiment of the second aspect, hydrogen fuel utilization as said performance parameter is monitored using hydrogen sensor or carbon dioxide sensor. In particular, there is provided a method for determining purged gas volume and composition in hydrogen fuel cell system using gas sensors and tracer gas. The method may utilize e.g. $CO_2$ or $H_2$ concentration measurement together with purged gas with constant composition.

This aspect has considerable advantages. It works with low cost sensors and utilizes instruments already existing in a PEFC system. The method has been verified experimentally.

The tracer gas may comprise hydrogen or, more preferably, carbon dioxide. For allowing operation in during maintenance of a fuel cell in addition to during operation of the fueld call, the tracer gas is provided to the anode gas circulation from a trace gas source separate from the anode gas source through as suitable feed valve. This is particularly preferred if carbon dioxide is used. Alternatively, the tracer gas is provided to the anode gas circulation from the fuel source mixed with the fuel.

The concentration of tracer gas in the purge gas can be used to determine the volume of the purged gas. Further, the concentration can be used to determine the efficiency of the fuel cell system as the performance parameter. In particular, fuel efficiency of the fuel cell system during steady state use or transient use of the fuel cell system can be determined.

According to one embodiment of the second aspect, the method comprises measuring the total accumulation of the tracer gas in the anode circulation and utilizing said total accumulation measurement to derive said system performance parameter in addition to the purged gas measurement. The accumulation of tracer gas can be measured by measuring concentration of tracer gas at the anode cells and/or upstream and/or downstream of the anode cells directly from the anode gas circulation, whereas the purge gas measurement is done from the volume (pipes) between the anode cells and the circulation pump and/or ejector.

According to one embodiment, the method comprises comparing the concentration of the tracer gas obtained in the additional measurement(s) to the concentration of the tracer gas in the purge gas. Further, said additional concentration measurement(s) can be used to derive said system performance parameter. The additional measurements may be carried out both upstream and downstream of the anode cells and anode cell membrane. Based on these measurements, permeability of the anode cell membrane may be determined.

According to one embodiment, the concentration of the tracer gas in fresh anode gas input of the anode gas circulation is at least 2 ppm.

The method may also comprise adjusting the duration of the gas purge based on the concentration of the tracer gas in the purge gas.

More specifically, the aspects of the invention are characterized by what is stated in the independent claims. Dependent claims focus on selected embodiments of the abovementioned aspects.

Next, embodiments, advantages and further uses of the invention are described in more detail with reference to the attached drawings.

DETAILED DESCRIPTION OF EMBODIMENTS

Multiple purge method for detecting water accumulation in anode gas channels

The water accumulation in anode channels is important to measure to optimize the duration and the frequency of purge during normal operation. In addition, the change (increase) in water accumulation under the same operation conditions can be used as diagnostic tool to estimate aging of the bipolar plate and GDL as aging of these components will increase water accumulation.

The practicality and accuracy of the method in this innovation can evaluated against the differential pressure drop method assuming pressure drop is large enough in the anode side of the stack.

The innovation can also be used for detection of bipolar plate and GDL aging on the cathode side, if fuel cell is arranged so that anode and cathode are interchanged.

However, the aging of cathode side components is easily seen from the pressure drop data. Pressure drop on the cathode side is significantly larger and the gas composition is more constant.

The innovation can be used in all fuel cell cars as well, as well as in some stationary systems.

Figure 1:
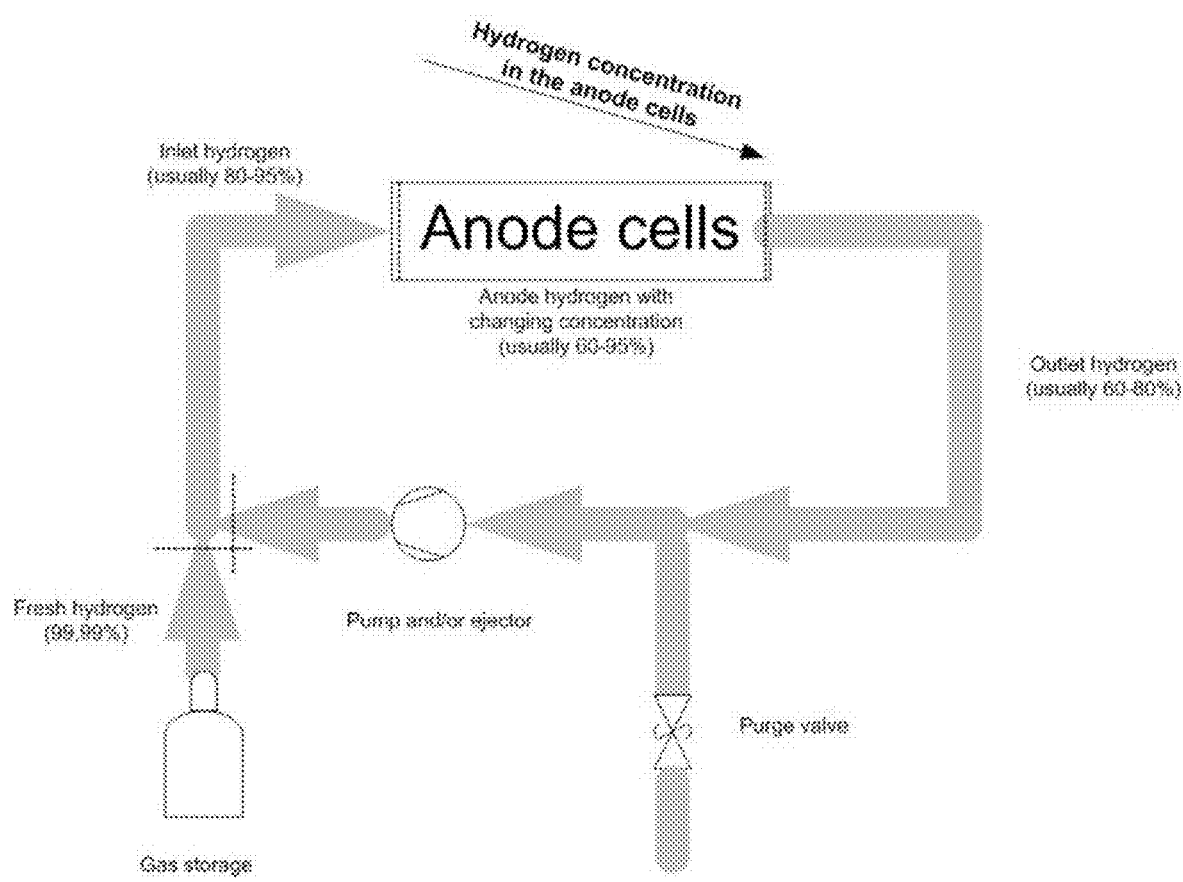
FIG. 1 shows the principal operation of anode side of the hydrogen fuel cell system in dead-anode mode, with recirculation of anode gas.

Hydrogen fuel cell systems for automotive and other applications are expected to operate with dead-end mode and with recirculation of hydrogen gas. FIG. 1 illustrates such system.

During the hydrogen purge, the purge valve is typically opened for a fraction of a second.

According to one embodiment, hydrogen purge is applied, when concentration of inert gases or water on the anode side has been accumulated to the level that the performance of the stack is decreased and should be retained.

According to one embodiment, purge is triggered by a voltage signal or it can be triggered periodically from calculated time and/or from the amount of current produced or due to pressure drop increase from the anode side.

Purge can also be performed for diagnostic purposes, if the processes of the purge provide valuable information for the system operation or for the estimation of system aging.

One of the problems on the PEFC is water accumulation in the gas channels on both anode and cathode.

If there is the same flow resistance in the cells, the volume of the purged gas is practically constant, since flow resistance during the purge determines the purged gas volume. If there is water in the channels, the flow resistance will be higher and the purged gas volume will be smaller. The hydrogen purge removes water from the channels. Therefore, if a second hydrogen purge is performed after the first one the purged gas volume should be larger. If there is no water in the channels, which is removed, the purged gas volumes should be equal, since flow resistance will be the same. The increase of purged volume can therefore be used as diagnostic signal for liquid water in the channels.

Figure 2:
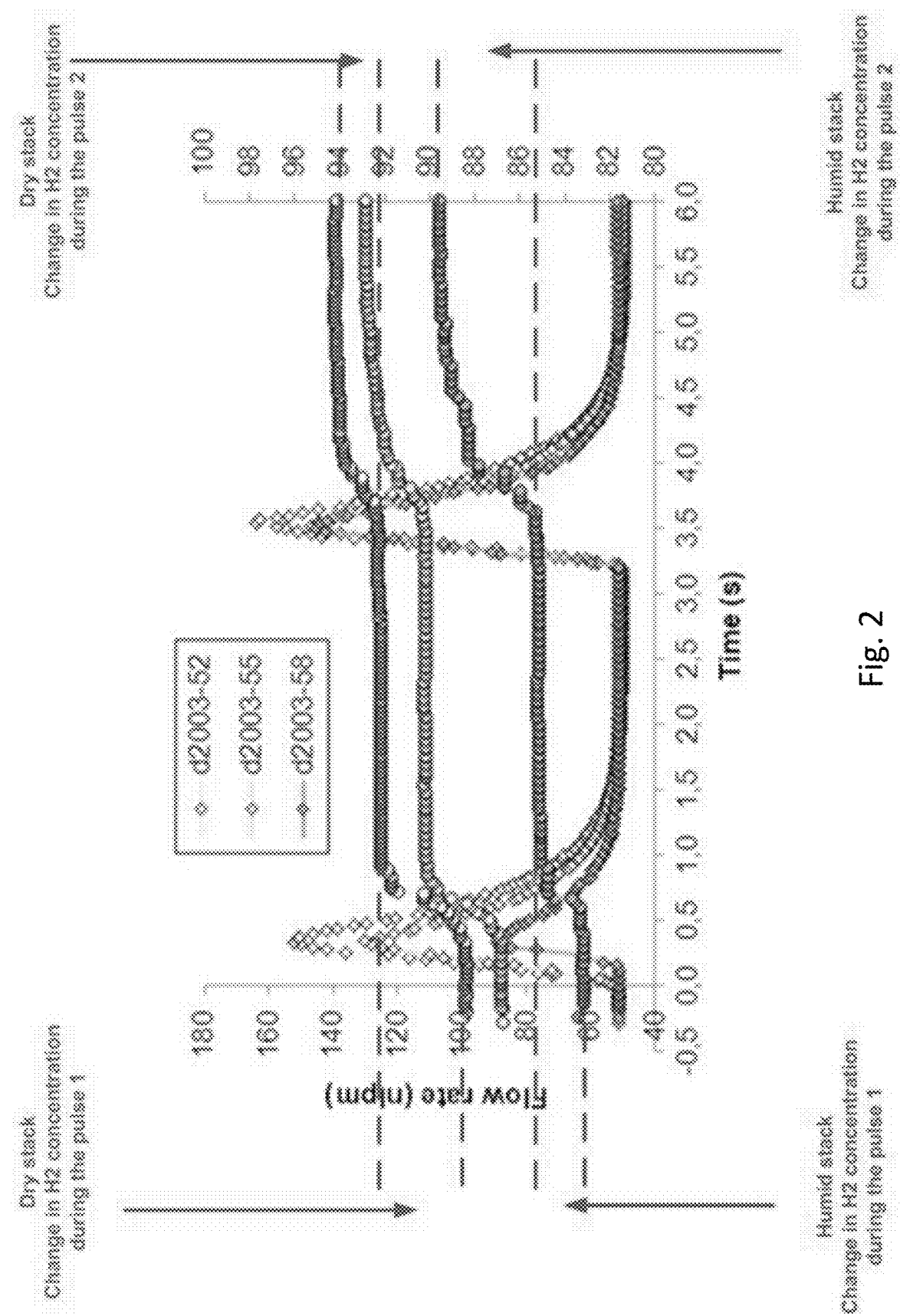
FIG. 2 shows as a graph the measurement of hydrogen flow and concentration during a double purge in different conditions (d2003-58=wet, d2003-52=dry)

The multiple purge method has been verified experimentally. FIG. 2 shows the results of experimental verification. As can be seen in the hydrogen flow rate signal, the flow rates (and purged gas volume) are practically constant, when stack is operating in dry conditions (d2003-52=dry) with minimal amount of water in anode gas channels. It can also be seen that in wet conditions (d2003-58=wet) the peak flow rate and purged gas volume of the second gas purge is over twice the flow rate and volume of the first purge.

The measurement of gas flow rates may not be practical in real fuel cell system. The purged volume is not possible to be measured in normal system as this requires high sampling rate and an expensive hydrogen flow meter.

According to one embodiment, purged volume is measured from the change (increase) in the hydrogen concentration, if the purged gas has constant concentration.

From FIG. 2, the different change in the concentration wet vs. dry condition is clearly seen. In wet condition the increase in the second purge is larger, while in dry conditions the increase in the second is smaller.

In every automotive fuel cell system there will be hydrogen concentration sensor.

Therefore, using double/multiple purge this method can be used to detect the presence of liquid water in the anode gas channels.

If the volume of the anode side is known, also absolute purged volume can be measured from the concentration change. If the purged volume is small enough, then only gas with outlet concentration (see FIG. 1) is purged and gas has constant composition.

Method of Analyzing Fuel Cell System Performance Using Tracer Gas and Tracer Gas Sensor Herein, the use of tracer gas sensor and tracer gas, preferably carbon dioxide, for the measurement of system performance (purged gas volume, fuel efficiency, system efficiency, or some other performance parameter) during use and/or maintenance of a fuel cell system, is described.

According to one embodiment, the inert gas accumulation rate is used for the measurement of purged gas volume (descriptive of fuel efficiency).

According to one embodiment, carbon dioxide concentration is used for measurement of purged gas volume (fuel efficiency). This may be done in steady state use of the fuel cell system or transient use of the system.

According to one embodiment, carbon dioxide or hydrogen concentration is determined for measurement of purged gas composition. Gas composition data can be used for adjusting purge time (valve open) so the hydrogen consumption can be minimized and purged gas volume can be measured accurately.

In the methods, proposed in this invention, the fuel utilization can be measured on-line by using gas sensors (carbon dioxide or hydrogen). The applicability of the methods during normal operation depends on the hydrogen quality used.

The methods can be used on-line during normal operation or during maintenance. During maintenance hydrogen fuel with higher carbon dioxide content can be used for reaching better measurement accuracy. In particular in the maintenance option, carbon dioxide can also be added in the fuel cell system separately from fuel line.

If carbon dioxide or hydrogen is also measured from exhaust anode gas then it can be verified that purged gas contains only gas between stack exit and purge valve.

In first embodiment of the proposed method (with hydrogen sensor) hydrogen fuel utilization can be monitored by measuring total inert gas accumulation rate and using hydrogen purges using so small purged gas volumes that purged gas constant composition.

In this method, both total inert gas content in the used hydrogen, as well as membrane gas permeability must be measured. This is possible, as shown by Karimaki et al. (2011). However, this method may not be practical in commercial applications, as inert gases are accumulated on the anode side also through the membrane and gas permeability of the membrane is dependent on the operating conditions. Inert gas content in hydrogen fuel may also be different in each filling.

In another embodiment of the proposed method (with carbon dioxide sensor) carbon dioxide content is monitored, instead of hydrogen concentration, using carbon dioxide sensor. If the used hydrogen contains sufficient amount of carbon dioxide (2 ppm) accumulated carbon dioxide is coming from the hydrogen and negligible amount is coming through the membrane from the cathode. Since all accumulated carbon dioxide can be assumed to come with hydrogen, the measurement of both carbon dioxide in hydrogen and hydrogen utilization become much simpler than using hydrogen sensor.

Additional carbon dioxide can also be added in the system either using hydrogen fuel containing tens of ppm carbon dioxide or adding carbon dioxide using another feeding line.

When this innovation is used with hydrogen sensor it does not require any additional instrumentation for the vehicle, as fuel cell systems in vehicles will be equipped by humidity and hydrogen concentration sensors. However, the accuracy is limited and the required measurement time is long.

When carbon dioxide sensor is used, more accurate measurement of fuel utilization can be reached. If there is not sufficient amount of carbon dioxide in hydrogen fuel, then carbon dioxide can be added as tracer gas and measurement of fuel utilization can be performed during vehicle maintenance.

Figure 3:
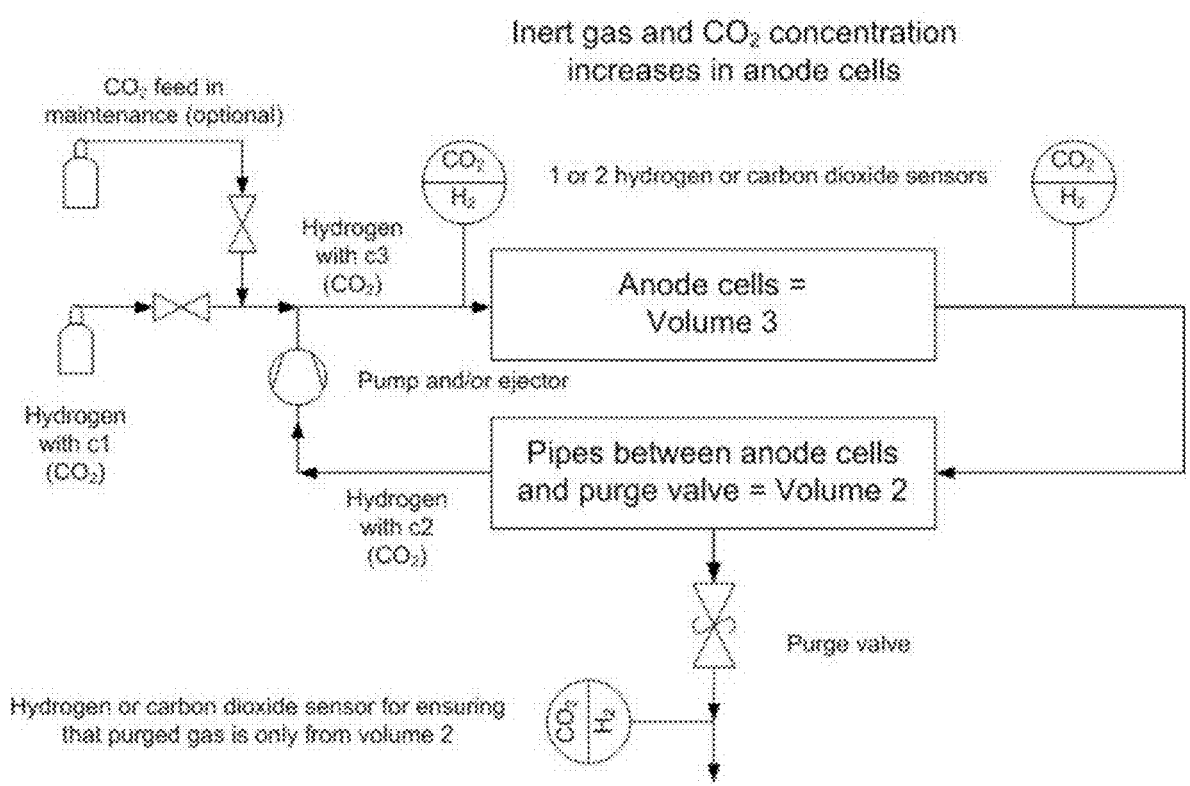
FIG. 3 illustrates the principal operation of anode side of the hydrogen fuel cell system in dead-anode mode, with recirculation of anode gas and description of gas volumes.

With reference to FIG. 3, there is hydrogen gas with 3 carbon dioxide (and inert gas) concentrations in the system: Fresh hydrogen ($c_1$), Recirculated/purged hydrogen ($c_2$) and Inlet hydrogen ($c_3$). In principle there is gradual a transition from $c_3$ to $c_2$ in the cells, but this can be assumed to be step-wise.

Use of Steady-State Level
Measurement of Purged Hydrogen Using Steady-State Information:

When purged gas volume is small it contains only gas with concentration $c_2$. This means that when $CO_2$ has reached a steady-state, then molar amount of $CO_2$ that exists from the volumes $V_2$ and $V_3$ must be the same as what is fed during the time with gas volume $V_1$.

When anode gas is purged, then purged gas volume ($V_p$) with concentration of $c_2(CO_2)$ is replaced by same gas volume with $c_1(CO_2)$ Then molar balance for the system is then:

$$c_1 * V_1 + c_1 * V_p = c_2 * V_p$$

and $V_p$ can be calculated easily:

$$V_p = c_1 * V_1 / (c_2 - c_1)$$

The key issue when using steady-state approach is reliable measurement of $c_2$ and determination of steady-state.

Use of Accumulation/Decumulation Rate

When gas volumes of V2 and V3 are known, then accumulation rate of carbon dioxide can be used.

Then molar balance for the system is then:

$$c_1 * V_1 + c_1 * V_p = c_2 * V_p + (\Delta c_2 * V_2 + \Delta c_3 * V_3)$$

where $(\Delta c_2 * V_2 + \Delta c_3 * V_3)$ is accumulation/decumulation of carbon dioxide in anode side of the system.

Calculation of $V_p$ is also then straightforward:

$$V_p = (c_1 * V_1 - (\Delta c_2 * V_2 + \Delta c_3 * V_3)) / (c_2 - c_1)$$

If system is initially filled with some concentration of carbon dioxide and pure hydrogen is used, then calculation becomes even more straightforward:

$$V_p = (\Delta c_2 * V_2 + \Delta c_3 * V_3) / c_2$$

Measurement of Single Purge Volume

The use of accumulation/decumulation rate can also be used for measuring a single purge.

The gas volume of single purge can also be calculated using measured carbon dioxide concentration before and after a single purge. Compared to the use of total inert gas amount the method is much more accurate and can be repeated with different condition by adding carbon dioxide as tracer gas in the system and using equation:

$$V_p = (\Delta c_2 * V_2 + \Delta c_3 * V_3) / c_2$$

Measurement of Purged Gas Composition

By measuring carbon dioxide concentration or hydrogen concentration in anode gas volume before the purge and comparing that to purged gas composition (measured from exhaust hydrogen) it can be verified if purged gas has had constant composition.

The invention claimed is:

1. A method of determining water accumulation in or removal from a fuel cell, the method comprising:
    circulating fuel gas in an anode side of the fuel cell for producing electric energy in a fuel cell process,
    providing at least two purge pulses from the fuel circulation,
    measuring the volume of purged gas during each of said at least two gas purge pulses, and
    calculating a ratio of a first gas volume and a second gas volume, the first gas volume being removed from the fuel cell during the first purge pulse and the second gas volume being removed during the second of the at least two gas purge pulses,
    based on said calculated ratio, determining the amount of water accumulated in the fuel cell,
    wherein said at least two gas purges are provided within a time period of 5 seconds.

2. The method according to claim 1, further comprising measuring fuel gas concentration in the at least two gas purge pulses as part of the determination of at least one of the amount of accumulated or removed water.

3. The method according to claim 1, further comprising providing the at least two gas purge pulses via a purge valve according to a purge valve opening sequence, the at least two purge pulses in said purge valve opening sequence being triggered by at least one of:
a predefined purge valve triggering scheme,
an elapsed time,
an amount of current produced by the fuel cell, and
a predefined increase of pressure drop at the anode side.

4. The method according to claim 1, wherein the at least two purge pulses each have a duration of a fraction of a second.

5. The method according to claim 1, wherein the fuel cell has a dead-end configuration.

6. The method according to claim 1, further comprising deriving a parameter descriptive of system performance or aging using said analysis.

7. The method according to claim 1, wherein a pressure drop in the anode side of the fuel cell is under 10 millibars.

8. The method according to claim 1, further comprising measuring gas volumes purged during the at least two purge pulses and determining said amount of water accumulation or removed at least partly based on said gas volumes.

9. The method according to claim 1, wherein the method is carried out in a fuel cell system of a vehicle.

10. The method according to claim 1, wherein the method is carried out in a stationary fuel cell system.

11. The method according to claim 1, wherein the fuel gas is hydrogen.

12. The method according to claim 1, wherein the fuel cell is a polymer electrolyte fuel cell (PEFC).

13. A method of determining water removed from a fuel cell, the method comprising:
circulating fuel gas in an anode side of the fuel cell for producing electric energy in a fuel cell process,
providing a first gas purge pulse and a second gas purge pulse from the fuel circulation,
analyzing the hydrogen composition of the gas purged during the first gas purge pulse and the second gas purge pulse, and
determining the amount of removed water by calculating a ratio of the hydrogen concentration of the first gas purge pulse with respect to the second gas purge pulse,
wherein the first and second gas purge pulses are sequential and of the same duration, wherein the duration is less than one second and the time between gas purge pulses is within five seconds.

14. The method of claim 13, wherein the gas purge pulses are performed for diagnostic purposes.

* * * * *